(12) United States Patent
Kato et al.

(10) Patent No.: US 12,454,148 B2
(45) Date of Patent: Oct. 28, 2025

(54) WHEEL FOR RAILWAY VEHICLE

(71) Applicant: NIPPON STEEL CORPORATION, Tokyo (JP)

(72) Inventors: Takanori Kato, Tokyo (JP); Yoshinari Yamamura, Tokyo (JP); Shingo Abe, Tokyo (JP); Jun Noguchi, Tokyo (JP); Chihiro Kozuka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 354 days.

(21) Appl. No.: 18/004,916

(22) PCT Filed: Oct. 12, 2021

(86) PCT No.: PCT/JP2021/037658
§ 371 (c)(1),
(2) Date: Jan. 10, 2023

(87) PCT Pub. No.: WO2022/091764
PCT Pub. Date: May 5, 2022

(65) Prior Publication Data
US 2023/0294453 A1  Sep. 21, 2023

(30) Foreign Application Priority Data
Oct. 27, 2020   (JP) .................... 2020-179613

(51) Int. Cl.
*B60B 17/00* (2006.01)
(52) U.S. Cl.
CPC .............. *B60B 17/0006* (2013.01)

(58) Field of Classification Search
CPC ............ B60B 17/0006; B60B 17/0068; B60B 2900/311; B60B 3/007; B60Y 2200/30
(Continued)

(56) References Cited

U.S. PATENT DOCUMENTS

| 3,915,490 A | 10/1975 | Ranger et al. |
| 6,033,001 A | 3/2000 | Fujimura et al. |
| 2009/0218837 A1 | 9/2009 | Mantkowski |

FOREIGN PATENT DOCUMENTS

| EP | 1389539 A1 * | 2/2004 | ......... B60B 17/0006 |
| FR | 2217197 A1 | 9/1974 | |
(Continued)

OTHER PUBLICATIONS

WO2020241401A1_espace.nt Eng Translation pub date Mar. 20, 2020 (Year: 2020).*

*Primary Examiner* — S. Joseph Morano
*Assistant Examiner* — Eva L Comino
(74) *Attorney, Agent, or Firm* — Greer, Burns & Crain, Ltd.

(57) ABSTRACT

A wheel includes a boss, a rim, and a web. The rim includes a tread and a flange. A center of the rim in the axial direction of the wheel is disposed closer to the flange in the axial direction than a center of the boss in the axial direction is. The web has a plate-thickness center line that has a linear shape when the wheel is viewed in its longitudinal section. When an angle that the plate-thickness center line forms with the axial direction is denoted by a, a distance in the axial direction from a side face of the rim to an outer end of the plate-thickness center line is denoted by Pw, a length of the rim in the axial direction is denoted by Wr, and Pw/Wr is denoted by L, the wheel satisfies the expression L≥0.0223α−1.363. Where, the angle α is 90° or less.

4 Claims, 5 Drawing Sheets

(58) Field of Classification Search
USPC .......................................................... 295/21
See application file for complete search history.

(56) References Cited

FOREIGN PATENT DOCUMENTS

| | | | | | |
|---|---|---|---|---|---|
| JP | 10119503 | A | | 5/1998 | |
| JP | 2004131002 | A | * | 4/2004 | ......... B60B 17/0068 |
| JP | 2009545484 | A | * | 12/2009 | ......... B60B 17/0068 |
| WO | 9954152 | A1 | | 10/1999 | |
| WO | WO-2008015712 | A1 | * | 2/2008 | ......... B60B 17/0006 |
| WO | WO-2020241401 | A1 | * | 12/2020 | ......... B60B 17/0006 |

* cited by examiner

Example 1

Example 2

Comparative Example 2

WHEEL FOR RAILWAY VEHICLE

TECHNICAL FIELD

The present disclosure relates to a wheel used in a railway vehicle.

BACKGROUND ART

A tread brake is known as one type of braking system for a railway vehicle. A tread brake is a braking system which, by pressing a brake shoe against a tread of a wheel of a railway vehicle, generates a frictional force between the tread and the brake shoe, and applies a brake to the railway vehicle using the frictional force.

In the case of utilizing a tread brake to apply a brake to a railway vehicle, because frictional heat is produced between the tread and the brake shoe, the temperature of the wheel, particularly the temperature of a rim that forms an outer circumferential portion of the wheel rises. As a result, thermal expansion of the rim occurs, and thermal stress is generated in the rim. Various wheel shapes have conventionally been proposed in order to reduce such thermal stress.

For example, Patent Literature 1 proposes a wheel including a rim that forms an outer circumferential portion of the wheel, a boss that forms an inner circumferential portion of the wheel, and a web that has a substantially S-shaped cross section. In the wheel proposed in Patent Literature 1, for the purpose of reducing thermal stress of the web and the rim, the amount of displacement of the rim with respect to the boss, and the amount of displacement of the web on the rim side are set to a predetermined value or more, respectively. The amount of displacement of the rim with respect to the boss is the distance between a perpendicular line extending from an end on the rim side of a curved plate-thickness center line of the web to an axial centerline of the wheel, and a perpendicular line extending from an end on the boss side of the plate-thickness center line to the axial centerline of the wheel. The amount of displacement of the web on the rim side is the distance between a perpendicular line extending from the end on the rim side of the plate-thickness center line to the axial centerline of the wheel, and a perpendicular line extending from the center of the rim in the axial direction of the wheel to the axial centerline of the wheel.

For example, Patent Literature 2 proposes a wheel in which a web is given a curved cross-sectional shape for the purpose of reducing thermal stress of the rim. In the wheel proposed in Patent Literature 2, the web has a cross-sectional shape that is referred to as a "bell shape". Both ends of a curved plate-thickness center line of the web are arranged on the same side with respect to the central plane of the wheel (a plane perpendicular to the axial centerline of the wheel). On the other hand, the midpoint of the plate-thickness center line is arranged on the opposite side to both ends of the plate-thickness center line with respect to the center plane of the wheel.

CITATION LIST

Patent Literature

Patent Literature 1: Japanese Patent Application Publication No. 10-119503
Patent Literature 2: Japanese Translation of PCT International Application Publication No. 2009-545484

SUMMARY OF INVENTION

Technical Problem

Usually, compressive residual stress is imparted to the rim of a wheel to be used in a railway vehicle by performing a heat treatment or the like during production. However, when a brake is applied to a railway vehicle by a tread brake and if high thermal stress is generated in the rim and plastic deformation occurs, the compressive residual stress of the rim may in some cases be reversed to tensile residual stress. Specifically, during braking of a railway vehicle, on one hand the temperature of the rim increases due to friction between the tread and the brake shoe and consequently the rim attempts to thermally expand, on the other hand the temperature increase on the inner circumferential side of the wheel is small. Therefore, the thermal expansion of the rim is inhibited, and in the rim, compressive stress is generated, in particular, in the circumferential direction of the wheel. If the compressive stress exceeds the yield point, plastic deformation of the rim occurs, and after the rim is cooled, the compressive stress reverses to tensile stress and acts as residual stress in the rim. It is considered that if a crack is generated in the tread in a state in which tensile residual stress has been generated in the rim, there is a possibility that the generated crack will propagate to the inside of the wheel. Hence, when a tread brake is used for applying a brake to a railway vehicle, it is necessary to reduce thermal stress that arises in the rim that is caused by the tread brake, and thereby suppress the generation of tensile residual stress in the rim.

The wheels disclosed in Patent Literatures 1 and 2 each have a web that has a curved shape. By this means, constraining thermal expansion of the rim from the web is relaxed. Hence, it is considered that, in the wheels disclosed in Patent Literatures 1 and 2, thermal stress generated in the rim during braking of the railway vehicle is reduced, and it is less likely for tensile residual stress to be generated in the rim. However, in a case where the web is curved, there is a problem that the weight of the wheel increases.

An objective of the present disclosure is to provide a wheel with respect to which a reduction in weight and suppression of the generation of tensile residual stress in the rim can both be achieved.

Solution to Problem

A wheel according to the present disclosure is to be used in a railway vehicle. The wheel includes a boss, a rim, and a web. The boss forms an inner circumferential portion of the wheel. An axle of the railway vehicle is to be inserted into the boss. The rim forms an outer circumferential portion of the wheel. The rim includes a tread and a flange. The tread is to come into contact with a top surface of a rail on which the railway vehicle travels. The flange protrudes from the tread outward in a radial direction of the wheel. The web has an annular shape and connects the rim and the boss. A center of the rim in an axial direction is disposed closer to the flange in the axial direction than a center of the boss in the axial direction is. The axial direction is a direction in which a central axis of the wheel extends. The web has a plate-thickness center line that has a linear shape when the wheel is viewed in a longitudinal section. When an angle that the plate-thickness center line forms with the axial direction is denoted by α, a distance in the axial direction from a side face on an opposite side to the flange among both side faces in the axial direction of the rim to an outer end in the radial direction of the plate-thickness center line is denoted by Pw, a length of the rim in the axial direction is denoted by Wr, and Pw/Wr is denoted by L, the wheel according to the present disclosure satisfies Formula (1) below:

$$L \geq 0.0223\alpha - 1.363 \tag{1}$$

where, the angle α is 90° or less. The angle α is defined as being 90° in a case where the plate-thickness center line is parallel to the radial direction, and is defined as being less than 90° in a case where the plate-thickness center line is inclined with respect to the radial direction by rotating to the opposite side to the flange around an inner end in the radial direction of the plate-thickness center line from a position of 90°.

Advantageous Effects of Invention

According to the present disclosure, a reduction in the weight of a wheel as well as suppression of the generation of tensile residual stress in the rim of the wheel can both be achieved.

DESCRIPTION OF EMBODIMENT

Figure 1:
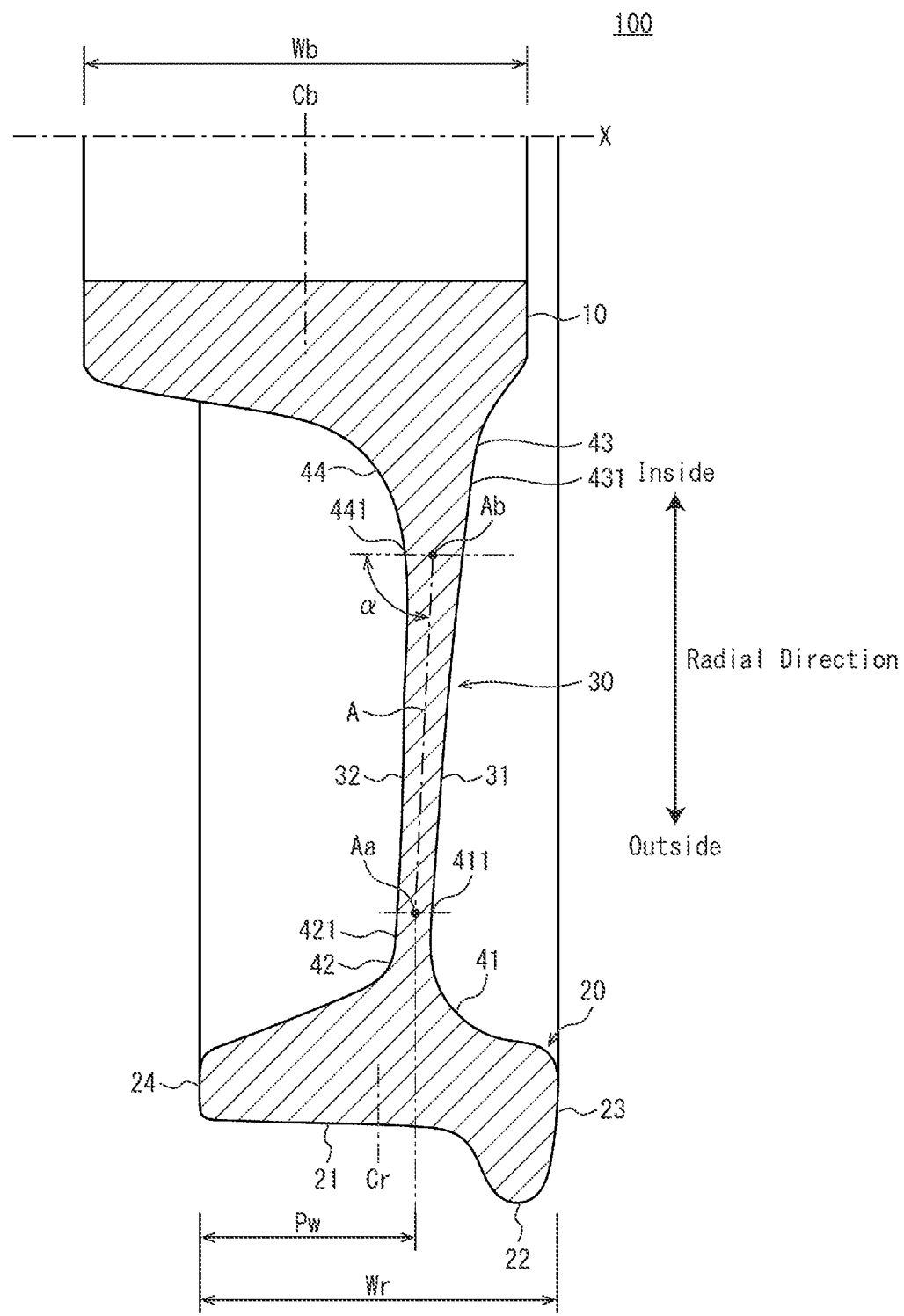
FIG. 1 is a longitudinal sectional view of a wheel according to an embodiment.

A wheel according to the embodiment (first configuration) is to be used in a railway vehicle. The wheel includes a boss, a rim, and a web. The boss forms an inner circumferential portion of the wheel. An axle of the railway vehicle is to be inserted into the boss. The rim forms an outer circumferential portion of the wheel. The rim includes a tread and a flange. The tread is to come into contact with a top surface of a rail on which the railway vehicle travels. The flange protrudes from the tread outward in a radial direction of the wheel. The web has an annular shape and connects the rim and the boss. The center of the rim in an axial direction is disposed closer to the flange in the axial direction than the center of the boss in the axial direction is. The axial direction is a direction in which the central axis of the wheel extends. The web has a plate-thickness center line that has a linear shape when the wheel is viewed in a longitudinal section.

When an angle that the plate-thickness center line forms with the axial direction is denoted by α, a distance in the axial direction from a side face on an opposite side to the flange among both side faces in the axial direction of the rim to an outer end in the radial direction of the plate-thickness center line is denoted by Pw, a length of the rim in the axial direction is denoted by Wr, and Pw/Wr is denoted by L, the wheel according to the first configuration satisfies the following Formula (1):

$$L \geq 0.0223\alpha - 1.363 \tag{1}$$

where, the angle α is 90° or less. The angle α is defined as being 90° in a case where the plate-thickness center line is parallel to the radial direction, and is defined as being less than 90° in a case where the plate-thickness center line is inclined with respect to the radial direction by rotating to the opposite side to the flange around an inner end in the radial direction of the plate-thickness center line from a position of 90°.

In the wheel according to the first configuration, the plate-thickness center line of the web is linear when the wheel is viewed in its longitudinal section and has no inflection point. In other words, the web connects the boss and the rim without substantially curving. Therefore, in comparison to a case where the web is curved, the weight of the web can be reduced. Hence, the wheel can be reduced in weight.

When a brake shoe of a tread brake is pressed against the tread of the rim of a wheel and thereby produces frictional heat, the rim undergoes thermal expansion. When the web constrains the thermal expansion of the rim, thermal stress is generated in the rim. If the thermal stress in the rim becomes excessive, the rim may be plastically deformed during braking of the railway vehicle, and after the rim is cooled, tensile residual stress may be generated in the circumferential direction of the wheel. On the other hand, the wheel according to the first configuration is formed in a shape such that a constraint imposed on the rim by the web is relaxed. More specifically, in the wheel according to the first configuration, on the premise that the center of the rim is located closer to the flange than the center of the boss is, the dimensions of each part are set so as to satisfy Formula (1) that takes into account both the angle of the plate-thickness center line of the web with respect to the axial direction of the wheel, and the position of the plate-thickness center line with respect to the rim. By this means, a constraint imposed on the rim by the web is effectively relaxed, and thermal expansion of the rim during braking can be allowed. Hence, thermal stress of the rim can be reduced, and plastic deformation of the rim can be suppressed. Therefore, the occurrence of a situation in which residual stress of the rim reverses to tensile when the rim is cooled after braking of the railway vehicle can be suppressed.

Thus, according to the wheel of the first configuration, a reduction in the weight of the wheel as well as suppression of the generation of tensile residual stress in the rim can both be achieved.

As mentioned above, in the wheel according to the first configuration, the plate-thickness center line of the web is linear when the wheel is viewed in its longitudinal section and has no inflection point. In this case, stress concentration is unlikely to occur in the web. It is therefore possible to reduce thermal stress of the web that is generated during braking of a railway vehicle.

According to the first configuration, the angle of the plate-thickness center line of the web with respect to the axial direction of the wheel is 90° or less. Therefore, the web does not incline to the inner side of the track as it extends outward in the radial direction. Hence, the rigidity of the web can be secured against a load that the wheel receives in the axial direction thereof from a rail when passing through a curve, in other words, a load (lateral force) that the wheel receives from the inner side of the track. Therefore, stress generated in the web can be reduced.

An angle α that the plate-thickness center line forms with the axial direction is preferably 87° or less (second configuration).

According to the second configuration, the angle of the plate-thickness center line of the web with respect to the axial direction of the wheel is 87° or less. In this case, the web inclines to the outer side of the track as it extends outward in the radial direction. Hence, the rigidity of the web with respect to a lateral force can be improved, and stress generated in the web can be reduced more. Further, since the necessity to increase the plate thickness of the web in order to secure the rigidity of the web with respect to a lateral force decreases, the weight of the web and the wheel can be reduced more.

The web may have a plate thickness that decreases as the web extends outward in the radial direction until a point inward from the outer end of the plate-thickness center line and has a minimum plate thickness at the point (third configuration).

An embodiment of the present disclosure will be described below with reference to the drawings. In the drawings, the same or equivalent components will be denoted by the same reference characters and repetitive description thereof will not be made.

FIG. 1 is a longitudinal sectional view of a wheel 100 according to the present embodiment. The longitudinal section refers to a cross section of the wheel 100 taken along a plane including a central axis X of the wheel 100. The longitudinal section of the wheel 100 is symmetric about the central axis X, and thus FIG. 1 illustrates the wheel 100 on one side of the central axis X only. Hereinafter, a direction in which the central axis X of the wheel 100 extends will be referred to as an axial direction, and a radial direction and a circumferential direction of the wheel 100 will be simply referred to as radial direction and circumferential direction, respectively.

Referring to FIG. 1, the wheel 100 is used in a railway vehicle. The wheel 100 includes a boss 10, a rim 20, and a web 30.

The boss 10 forms an inner circumferential portion of the wheel 100. The boss 10 has a substantially cylindrical shape the axial centerline of which is the central axis X. An axle of the railway vehicle (not illustrated) is to be inserted into the boss 10.

The rim 20 forms an outer circumferential portion of the wheel 100. The rim 20 is disposed outside the boss 10 in the radial direction. The rim 20 includes a tread 21 and a flange 22. The tread 21 and the flange 22 are provided on the outer peripheral surface of the rim 20.

The tread 21 faces outward in the radial direction. The tread 21 is to come into contact with a top surface of a rail on which the railway vehicle travels. Typically, the diameter of the tread 21 gradually increases toward the flange 22 side. For example, the tread 21 may be a conical tread or may be an arc tread.

The flange 22 is provided at one end of the rim 20 in the axial direction. The flange 22 protrudes from the tread 21 outward in the radial direction. When the railway vehicle travels on right and left rails, the flange 22 is positioned inward from the rails. Hereinafter, in the axial direction of the wheel 100, a direction toward a side on which the flange 22 is disposed will be referred to as a flange direction, and the opposite direction will be referred to as a counter-flange direction.

The rim 20 further includes both side faces 23 and 24 in the axial direction. The side face 23 is a side face on a flange 22 side, and the side face 24 is a side face on the opposite side to the flange 22. In other words, the side face 23 is disposed in the flange direction with respect to the side face 24. The side face 24 is disposed in the counter-flange direction with respect to the side face 23 across the tread 21 and the flange 22.

The rim 20 is disposed in the flange direction with respect to the boss 10. More specifically, a center Cr of the rim 20 in the axial direction is disposed closer to the flange 22 in the axial direction than a center Cb of the boss 10 in the axial direction is. When the railway vehicle travels, the center Cr of the rim 20 is positioned on the inner side in the track width direction relative to the center Cb of the boss 10.

The web 30 has an annular shape. The web 30 connects the boss 10 and the rim 20. The web 30 has a plate thickness that is smaller as a whole than each of a boss width Wb and a rim width Wr. The plate thickness of the web 30 is large on its boss 10 side and small on its rim 20 side. The boss width Wb refers to the length of the boss 10 in the axial direction. The rim width Wr refers to the length of the rim 20 in the axial direction, and is the maximum distance from the side face 23 to the side face 24 of the rim 20 in the axial direction.

The web 30 includes both side faces 31 and 32 in the axial direction. The side face 31 is a side face on a flange 22 side, and the side face 32 is a side face on the opposite side to the flange 22. In other words, the side face 31 is disposed in the flange direction with respect to the side face 32. The side face 32 is disposed in the counter-flange direction with respect to the side face 31. When the wheel 100 is viewed in its longitudinal section, the side faces 31 and 32 are preferably inclined with respect to the radial direction. The side faces 31 and 32 are connected to the rim 20 via connecting portions 41 and 42, respectively. The side faces 31 and 32 are connected to the boss 10 via connecting portions 43 and 44, respectively. Each of the connecting portions 41, 42, 43 and 44 has, for example, a substantially arcuate shape when the wheel 100 is viewed in its longitudinal section.

In the present embodiment, one of an end (R end) 411 of the connecting portion 41 on the web 30 side and an end (R end) 421 of the connecting portion 42 on the web 30 side that is positioned more inward than the other in the radial direction is defined to be an outer circumference end of the web 30. In addition, one of an end (R end) 431 of the connecting portion 43 on the web 30 side and an end (R end) 441 of the connecting portion 44 on the web 30 side that is positioned more outward than the other in the radial direction is defined to be an inner circumference end of the web 30. The outer circumference end of the web 30 can be regarded as a root of the web 30 with respect to the rim 20. The inner circumference end of the web 30 can be regarded as a root of the web 30 with respect to the boss 10. In the present embodiment, the end 411 of the connecting portion 41 and the end 441 of the connecting portion 44 are the outer circumference end and the inner circumference end of the web 30, respectively.

The plate thickness of the web 30 decreases as the web 30 extends outward in the radial direction until a position inward from the outer circumference end 411 and is minimized at the position. The web 30 has its minimum plate thickness at a position that is inward from the outer circumference end 411 in the radial direction and is in the vicinity of the outer circumference end 411. A position at which the plate thickness of the web 30 is minimized substantially coincides with a position at which a bending stress produced in the web 30 by a bending load received by the wheel 100 from a rail when the railway vehicle passes a curve is minimized. For example, the plate thickness of the web 30 can be minimized at a position that is 5 mm to 30 mm inward from the outer circumference end 411 in the radial direction.

The web 30 has a plate-thickness center line A. The plate-thickness center line A is a line that, when the wheel 100 is viewed in its longitudinal section, is formed by connecting the plate thickness centers of the web 30 extending from the boss 10 to the rim 20. The plate-thickness center line A passes midpoints between the side faces 31 and 32 and extends from the boss 10 side to the rim 20 side. When the wheel 100 is viewed in its longitudinal section, the plate-thickness center line A has a linear shape. A linear shape herein includes not only a perfect straight line but also a very gentle arc having a curvature radius of, for example, 1000 mm or more, or even a polygonal chain. In other words, the plate-thickness center line A is any line that can be recognized as a substantially straight line when the wheel 100 is viewed in its longitudinal section. Since the plate-thickness center line A has a linear shape when the wheel 100 is viewed in its longitudinal section, the web 30 has a substantially flat disk shape and is not substantially bent in the axial direction.

The plate-thickness center line A has an outer end Aa in the radial direction, and an inner end Ab in the radial direction. The outer end Aa is a point at which the plate-thickness center line A is connected to a straight line that passes the outer circumference end 411 of the web 30 and extends in the axial direction. The inner end Ab of the plate-thickness center line A is a point at which the plate-thickness center line A is connected to a straight line that passes the inner circumference end 441 of the web 30 and extends in the axial direction.

The position of the web 30 with respect to the rim 20 is determined by the position in the axial direction of the outer end Aa of the plate-thickness center line A. In the present embodiment, among the both side faces 23 and 24 of the rim 20, the distance in the axial direction from the side face 24 in the counter-flange direction to the outer end Aa of the plate-thickness center line A is defined as a web position Pw. The smaller that a ratio L (L=Pw/Wr) of the web position Pw to the rim width Wr is, the farther that the outer circumference end 411 of the web 30 will be from the flange 22, and the larger that the ratio L is, the closer that the outer circumference end 411 of the web 30 will be to the flange 22.

The ratio L (L=Pw/Wr) of the web position Pw to the rim width Wr is determined by the relation with an angle α of the plate-thickness center line A. The ratio L of the web position Pw to the rim width Wr, and the angle α of the plate-thickness center line A are determined so as to satisfy the following Formula (1).

$$L \geq 0.0223\alpha - 1.363 \quad (1)$$

The angle α of the plate-thickness center line A is an angle that, when the wheel 100 is viewed in its longitudinal section, the plate-thickness center line A forms with the axial direction. In a case where the plate-thickness center line A is a very gentle curve, the angle α is determined to be an angle formed by a tangential line at a center of the plate-thickness center line A (midpoint between the outer end Aa and the inner end Ab) with the axial direction. In a case where the plate-thickness center line A is a polygonal chain, the angle α is determined to be an angle formed by the longest segment among segments included in the plate-thickness center line A with the axial direction. With regard to the angle α, the angle α is defined as being 90° in a case where the plate-thickness center line A is parallel with the radial direction. Further, the angle α is defined as being less than 90° in a case where the plate-thickness center line A is inclined with respect to the radial direction as a result of the plate-thickness center line A rotating to the opposite side to the flange 22 around the inner end Ab from the position of 90°. In other words, in a case where the outer end Aa of the plate-thickness center line A is disposed in the counter-flange direction with reference to the position where the angle α is 90°, the angle α is determined as being less than 90°.

The angle α of the plate-thickness center line A is set to 90° or less. The angle α is preferably 87° or less, which however depends on specifications of a tread brake used for the wheel 100 or the like. As the angle α decreases and the inclination of the web 30 in the counter-flange direction increases, the more that a constraint imposed on the rim 20 by the web 30 is relaxed, and deformation of the rim 20 during braking of the railway vehicle is more easily allowed. From the viewpoint of the manufacturability of the wheel 100 and the like, the angle α is preferably 75° or more.

On the other hand, as the ratio L of the web position Pw to the rim width Wr increases and the root of the web 30 with respect to the rim 20 comes closer to the flange 22, the more that a constraint imposed on the rim 20 by the web 30 is relaxed, and deformation of the rim 20 during braking of the railway vehicle is more easily allowed. From the viewpoint of the manufacturability of the wheel 100 and the like, the ratio L is preferably set within a range of 0.3 or more to 0.7 or less.

Advantageous Effects

In the wheel 100 according to the present embodiment, the angle α of the plate-thickness center line A, and the ratio L of the web position Pw with respect to the rim width Wr are both appropriately set so that a constraint imposed on the rim 20 by the web 30 is relaxed. Specifically, in the present embodiment, on the premise that the center Cr of the rim 20 is located closer to the flange 22 in comparison with the center Cb of the boss 10, and the web 30 and the plate-thickness center line A thereof have a linear shape when the wheel 100 is viewed in its longitudinal section, the angle α of the plate-thickness center line A and the ratio L of the web position Pw to the rim width Wr are set so as to satisfy the relation in the aforementioned Formula (1). By this means, in the wheel 100 in which the center Cr of the rim 20 is located closer to the flange 22 in comparison with the center Cb of the boss 10, and in which the web 30 and the plate-thickness center line A thereof have a linear shape, the degree of constraint imposed on the rim 20 by the web 30 can be effectively reduced. Therefore, when the brake shoe of a tread brake presses against the tread 21 of the rim 20 and frictional heat is generated, thermal expansion of the rim 20 is less likely to be inhibited. Hence, when using a tread brake to apply a brake to the railway vehicle, thermal stress of the rim 20 that occurs due to the tread brake can be reduced, and plastic deformation of the rim 20 can be suppressed. As a result, the occurrence of a situation in which residual stress of the rim 20 reverses to tensile after the rim 20 is cooled can be suppressed.

In the wheel 100 according to the present embodiment, when the wheel 100 is viewed in its longitudinal section, the plate-thickness center line A of the web 30 is linear and has no inflection point. In other words, the web 30 connects the boss 10 and the rim 20 without substantially curving. Therefore, in comparison to a case where the web 30 is curved, the weight of the web 30 can be reduced. Hence, a reduction in the weight of the wheel 100 can be realized.

Further, because the plate-thickness center line A has a linear shape and the web 30 substantially does not curve, stress concentration in the web 30 can be eased during application of a brake to the railway vehicle by a tread brake. Hence, thermal stress of the web 30 that is generated during braking of the railway vehicle can be reduced.

For example, in a case where the web 30 inclines in the flange direction (toward the inner side of the track) as it extends outward in the radial direction, the rigidity of the web 30 with respect to a load which the wheel 100 receives in the axial direction thereof from a rail when passing through a curve, that is, a load (lateral force) by which the wheel 100 is pushed in the flange direction by the rail will decrease. In contrast, in the present embodiment, since the angle α of the plate-thickness center line A is set to 90° or less, the web 30 substantially does not incline in the flange direction as it extends outward in the radial direction. Thus, the rigidity of the web 30 with respect to a lateral force can be secured. Therefore, stress generated in the web 30 can be reduced.

In the wheel 100 according to the present embodiment, the angle α of the plate-thickness center line A is preferably 87° or less. In this case, the web 30 will incline in the counter-flange direction (toward the outer side of the track) as it extends outward in the radial direction. By this means, the rigidity of the web 30 with respect to a lateral force can be improved, and stress generated in the web 30 can be further reduced.

In a case where, when the wheel 100 is viewed in its longitudinal section, the side faces 31 and 32 of the web 30 are parallel with the radial direction of the wheel 100 (a case where the side faces 31 and 32 are perpendicular to the central axis X of the wheel 100), the rim 20 is liable to be constrained by the web 30. Therefore, preferably the side faces 31 and 32 of the web 30 are inclined with respect to the radial direction of the wheel 100. For example, the side faces 31 and 32 may each be inclined with respect to the radial direction so as to go in the counter-flange direction (toward the outer side of the track) as the side faces 31 and 32 approach the rim 20. By causing the side faces 31 and 32 to incline in the radial direction, the constraint imposed on the rim 20 by the web 30 can be further relaxed.

In the present embodiment, the plate thickness of the web 30 decreases as the web 30 extends outward in the radial direction until a point inward from the outer end Aa of the plate-thickness center line A and is minimized at the point. More specifically, in the web 30, the position at which the bending stress produced by a bending load received from a rail when the railway vehicle passes a curve is minimized is made to substantially coincide with the position at which the plate thickness is minimized. With this configuration, it is possible to prevent fatigue fracture of the web 30, increasing the durability of the wheel 100.

An embodiment according to the present disclosure is described above, but the present disclosure is not limited to the above embodiment, and various modifications may be made without departing the gist and scope of the present disclosure.

EXAMPLE

The present disclosure will be described below more in detail with reference to EXAMPLE. However, the present disclosure should not be construed to be limited to the EXAMPLE described below.

Figure 2:
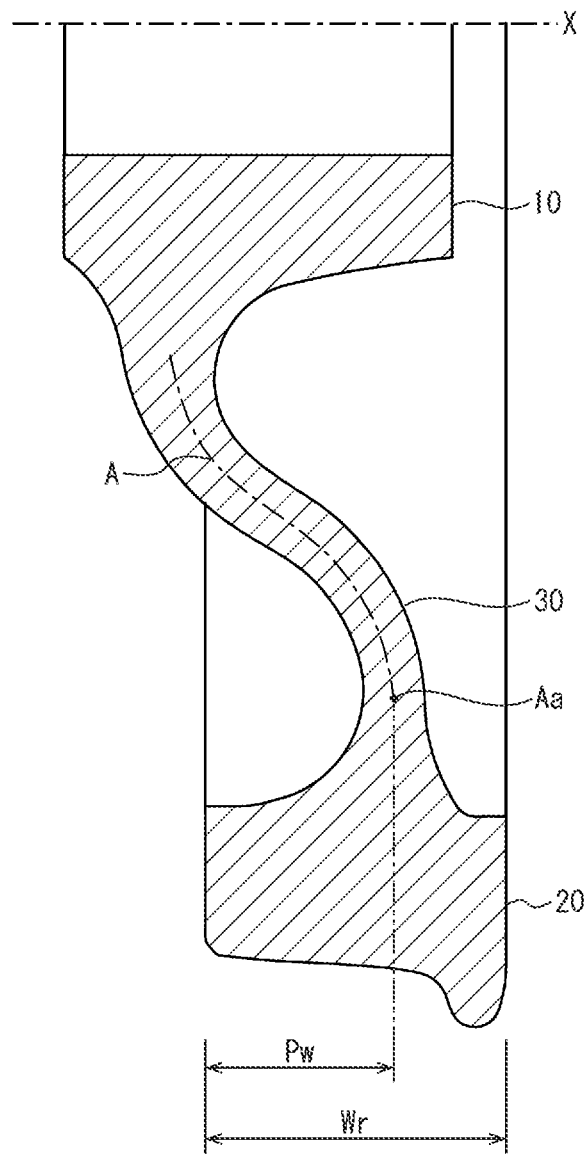
FIG. 2 is a view schematically illustrating a wheel that has a web with an S-shaped cross section.

A numerical analysis by the finite element method (FEM analysis) was conducted in order to investigate wheel shapes which are capable of suppressing the generation of tensile residual stress in the rim. In the FEM analysis, an analytic model having the same shape as that of the wheel 100 according to the above-described embodiment (FIG. 1) was created, and evaluation of the residual stress of the rim was performed while the angle (plate angle) a of the linear plate-thickness center line A, and the ratio L (L=Pw/Wr) of the web position Pw to the rim width Wr were changed. Further, evaluation of the residual stress of the rim was also performed with respect to an analytic model of a wheel having a web with an S-shaped cross section. FIG. 2 is a view that schematically illustrates a wheel having a web with an S-shaped cross section. The respective parameters a and conditions of L are shown in Table 1.

TABLE 1

|  | Plate angle α (°) | L = Web position Pw (mm)/ Rim width Wr (mm) |
|---|---|---|
| Example 1 | 80 | 0.448 |
| Example 2 | 87 | 0.580 |
| Example 3 | 90 | 0.680 |
| Comparative Example 1 | 85 | 0.448 |
| Comparative Example 2 | 90 | 0.448 |
| Comparative Example 3 | 90 | 0.560 |
| Comparative Example 4 | S-shaped cross section | 0.648 |

The FEM analysis was conducted with general-purpose software (ABAQUS Ver.6.12, from Dassault Systemes SE). In the analysis, to simulate braking of a railway vehicle with a tread brake, heat flux was provided to a region of a tread of a wheel that is to come into contact with a brake shoe of the tread brake. Braking duration was set at 1200 seconds, and an inner circumferential portion of a wheel was fully constrained.

The values for residual stress of the rim (rim residual stress) obtained by the FEM analysis are shown in Table 2. In Table 2, the rim residual stress shows the maximum circumferential stress of the rim after braking and cooling. If the rim residual stress is a negative value, it indicates that the residual stress of the rim was compressive after braking also, while if the rim residual stress is a positive value, it indicates that the residual stress of the rim changed to tensile after braking.

TABLE 2

|  | Rim residual stress (MPa) |
|---|---|
| Example 1 | −12 |
| Example 2 | −3 |
| Example 3 | −16 |
| Comparative Example 1 | 31 |
| Comparative Example 2 | 61 |
| Comparative Example 3 | 30 |
| Comparative Example 4 | −14 |

As shown in Table 2, in each of Examples 1 to 3, the rim residual stress was a negative value. In other words, in Examples 1 to 3, because the thermal stress of the rim during braking was reduced, the residual stress of the rim could be kept compressive after braking also. On the other hand, in Comparative Examples 1 to 3, the rim residual stress became a positive value. In other words, in Comparative Examples 1 to 3, the result of the FEM analysis showed that the residual stress of the rim changed in tensile after braking. In Comparative Example 4, the rim residual stress was a negative value, but because the web was curved, the weight of the wheel increased in comparison to Examples 1 to 3 and Comparatives Example 1 to 3 in which the web was not curved. Thus, in Example 1 to 3, it was possible to suppress the generation of tensile residual stress in the rim without increasing the weight of the wheel.

Hereunder, the influence of the plate angle α and the ratio L of the web position Pw to the rim width Wr on the residual stress of the rim is discussed.

Figure 3:
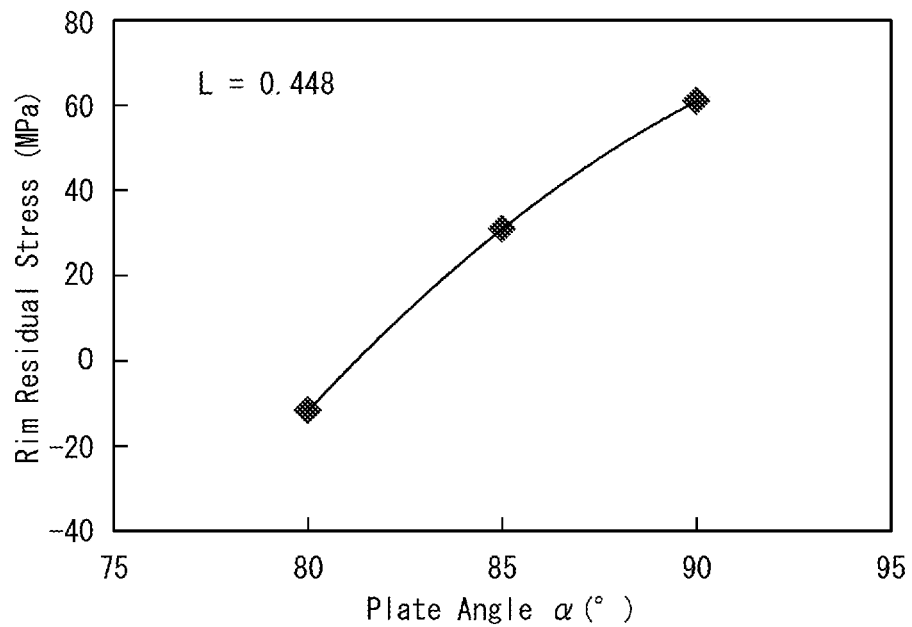
FIG. 3 is a graph showing the relation between a plate angle and rim residual stress with respect to an Example and Comparative Examples in each of which the value of a ratio of a web position to a rim width is the same.

FIG. 3 is a graph showing the relation between the plate angle α and the rim residual stress with respect to Example 1, Comparative Example 1, and Comparative Example 2 in each of which the value of the ratio L of the web position Pw to the rim width Wr is the same. As illustrated in FIG. 3, it is found that the value of the rim residual stress becomes larger as the plate angle α increases. Therefore, it can be said that as the plate angle α becomes smaller, the possibility that residual stress of the rim will change to tensile after braking of the railway vehicle decreases.

Figure 4:
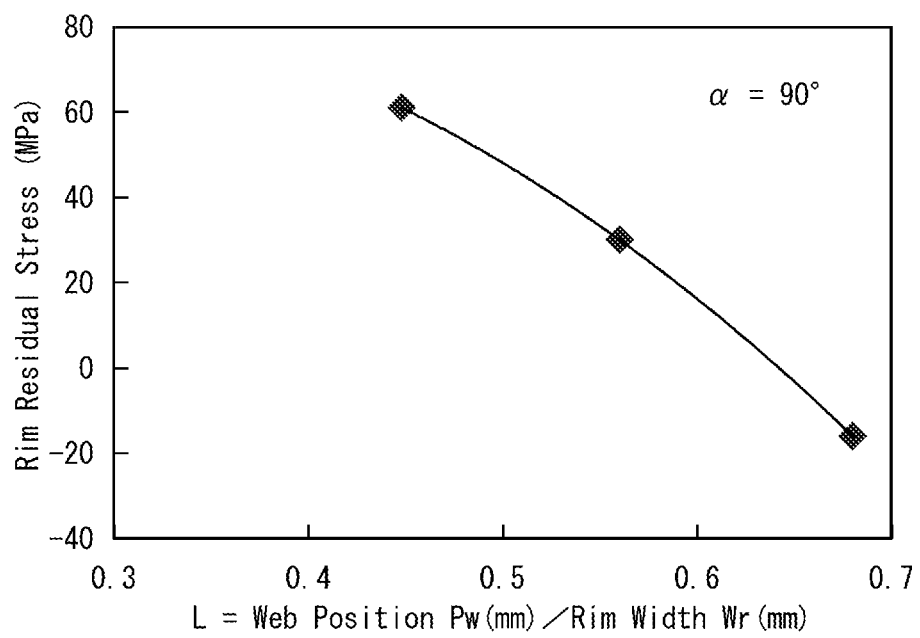
FIG. 4 is a graph showing the relation between a ratio of a web position to a rim width and rim residual stress with respect to an Example and Comparative Examples in which plate angles are equal.

FIG. 4 is a graph showing the relation between the ratio L of the web position Pw to the rim width Wr and the rim residual stress with respect to Example 3, Comparative Example 2, and Comparative Example 3 in each of which the plate angle α is the same. As illustrated in FIG. 4, it is found that as the ratio L of the web position Pw to the rim width Wr increases, the value of the rim residual stress decreases. Therefore, it can be said that as the ratio L becomes larger, the possibility that the residual stress of the rim will change to tensile after braking of the railway vehicle decreases.

Figure 5:
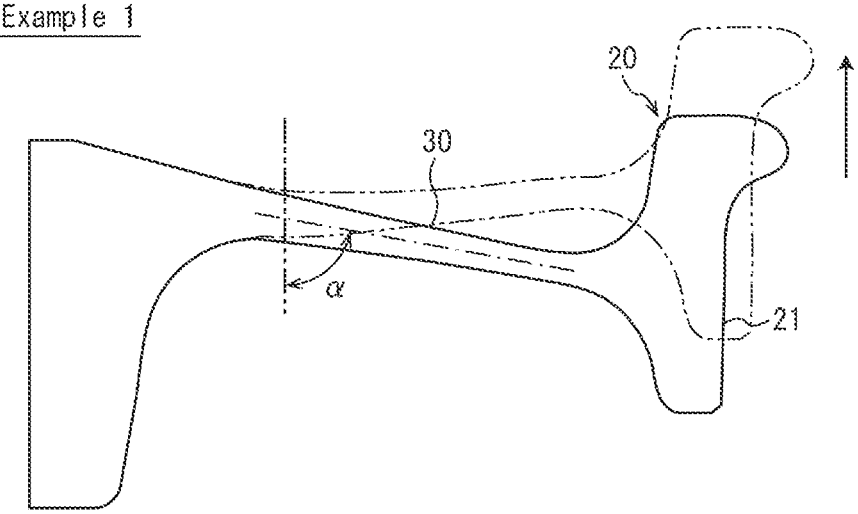
FIG. 5 is a diagram exemplifying, in an exaggerated manner, a deformation which occurred in a wheel during braking in an Example.
Figure 6:
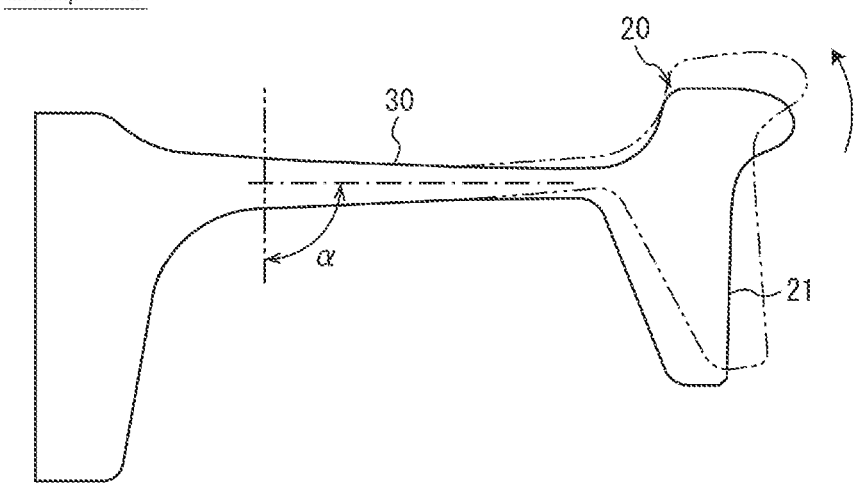
FIG. 6 is a diagram exemplifying, in an exaggerated manner, a deformation which occurred in a wheel during braking in a different Example to the Example in FIG. 5.
Figure 7:
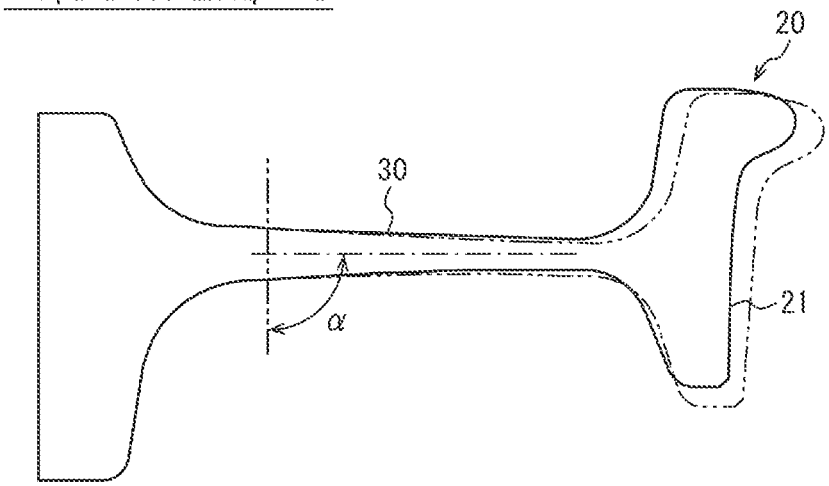
FIG. 7 is a diagram exemplifying, in an exaggerated manner, a deformation which occurred in a wheel during braking in a Comparative Example.

Thus, the smaller that the plate angle α is, the more that the residual stress of the rim decreases, and furthermore, the larger that the ratio L of the web position Pw to the rim width Wr is, the more that the residual stress of the rim decreases. The reason for this will be described referring to FIG. 5 to FIG. 7. FIG. 5 to FIG. 7 are diagrams exemplifying, in an exaggerated manner, a deformation which occurred in a wheel during braking in Example 1, Example 2, and Comparative Example 2, respectively.

In Example 1 in which the plate angle α was a small value of 80°, which is small, as illustrated in FIG. 5, when the heat flux was applied to the tread 21, the rim 20 moved by a large amount in the flange direction. In other words, in Example 1, because the plate angle α was small, a constraint imposed by the web 30 with respect to movement of the rim 20 in the flange direction was reduced, and thermal expansion of the rim 20 could be allowed. Therefore, in Example 1, thermal stress generated in the rim 20 during braking was reduced, and the residual stress of the rim 20 remained compressive after braking.

In Example 2 in which the ratio L of the web position Pw to the rim width Wr was a comparatively large value of 0.580, as illustrated in FIG. 6, when the heat flux was applied to the tread 21, the rim 20 rotated in the flange direction. In other words, in Example 2, since the ratio L was secured, a constraint imposed by the web 30 with respect to rotation of the rim 20 in the flange direction was reduced, and thermal expansion of the rim 20 could be allowed. Therefore, in Example 2, thermal stress generated in the rim 20 during braking was reduced, and the residual stress of the rim 20 remained compressive after braking.

In contrast, in Comparative Example 2 in which the plate angle α was 90° which was large compared to Example 1, and the ratio L of the web position Pw to the rim width Wr was 0.448 which was small compared to Example 2, as illustrated in FIG. 7, almost no movement or rotation of the rim 20 occurred. In Comparative Example 2, a constraint imposed by the web 30 with respect to movement and rotation of the rim 20 was large, and when the heat flux was applied to the tread 21, thermal expansion of the rim 20 was inhibited. Therefore, in Comparative Example 2, thermal stress generated in the rim 20 during braking was large, and the residual stress of the rim 20 changed to tensile after braking.

Figure 8:
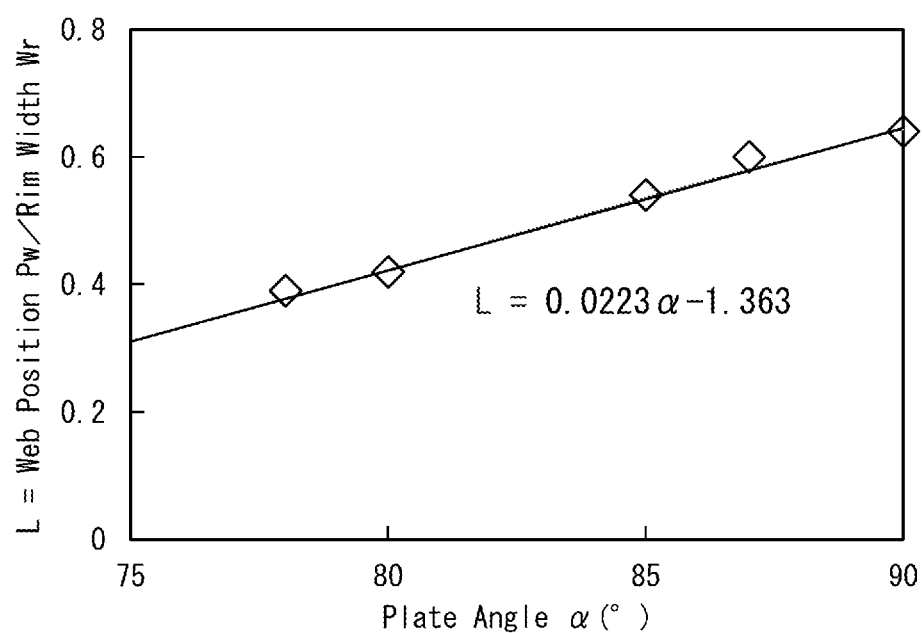
FIG. 8 is a view illustrating, in a relation between a plate angle and a ratio of a web position to a rim width, a limit line at which residual stress of a rim does not reverse to tensile.

As described above, both the plate angle α and the ratio L of the web position Pw to the rim width Wr are involved in reversal of residual stress of a rim to tensile that occurs due to braking performed by a tread brake. Therefore, the relation between the plate angle α and the ratio L which can prevent residual stress of the rim from changing to tensile when a brake is applied to a railway vehicle by a tread brake was determined. FIG. 8 illustrates, in the relation between the plate angle α and the ratio L, a limit line at which residual stress of the rim does not reverse to tensile.

The plotted points in FIG. 8 represent results obtained by performing a similar FEM analysis as the FEM analysis described above, and represent the ratio L=web position Pw/rim width Wr when the rim residual stress was 0 with respect to respective plate angles α of 78°, 80°, 85°, 87°, and 90°. A straight line in FIG. 8 was obtained by approximating these plotted points by the method of least squares, and is represented by L=0.0223α−1.363. In the region on the upper side of the straight line, the rim residual stress becomes compressive. Hence, a case where residual stress of a rim can be substantially prevented from becoming tensile is a case where the plate angle α and the ratio L satisfy the following Formula (1). However, the plate angle α is to be 90° or less. The following Formula (1) can be applied as long as the wheel is one in which the center of the rim is disposed closer to the flange than the center of the boss is, and the web and the plate-thickness center line thereof have a linear shape.

$$L \geq 0.0223\alpha - 1.363 \qquad (1)$$

It was confirmed whether or not the respective Examples and respective Comparative Examples satisfied the above Formula (1). As shown in Table 3, Examples 1 to 3 in which the rim residual stress was a negative value satisfied the above Formula (1). On the other hand, Comparative Examples 1 and 2 in which the rim residual stress was a positive value did not satisfy the above Formula (1). Thus, it can be said that in a wheel in which the center of the rim is disposed closer to the flange than the center of the boss is, and in which the web and a plate-thickness center line thereof have a linear shape, in a case where the plate angle α and the ratio L of the web position Pw to the rim width Wr are set so as to satisfy the above Formula (1), generation of tensile residual stress in the rim can be suppressed.

TABLE 3

| | α(°) | L = Pw/Wr | 0.0223α − 1.363 | L ≥ 0.0223α − 1.363 |
|---|---|---|---|---|
| Example 1 | 80 | 0.448 | 0.421 | YES |
| Example 2 | 87 | 0.580 | 0.577 | YES |
| Example 3 | 90 | 0.680 | 0.644 | YES |
| Comparative Example 1 | 85 | 0.448 | 0.533 | NO |
| Comparative | 90 | 0.448 | 0.644 | NO |

TABLE 3-continued

| | α(°) | L = Pw/Wr | 0.0223α − 1.363 | L ≥ 0.0223α − 1.363 |
|---|---|---|---|---|
| Example 2 Comparative Example 3 | 90 | 0.560 | 0.644 | NO |

REFERENCE SIGNS LIST

100: wheel
10: boss
20: rim
21: tread
22: flange
30: web
A: plate-thickness center line

The invention claimed is:

1. A wheel to be used in a railway vehicle, the wheel comprising:
   a boss that forms an inner circumferential portion of the wheel and into which an axle of the railway vehicle is to be inserted;
   a rim that forms an outer circumferential portion of the wheel and includes a tread to come into contact with a top surface of a rail on which the railway vehicle travels and a flange protruding outward from the tread in a radial direction of the wheel; and
   a web that has an annular shape and connects the boss and the rim, wherein
   a center of the rim in an axial direction that is a direction in which a central axis of the wheel extends is disposed closer to the flange in the axial direction than a center of the boss in the axial direction is,
   the web has a plate-thickness center line having a linear shape when the wheel is viewed in a longitudinal section,
   when an angle that the plate-thickness center line forms with the axial direction is denoted by a, the angle being defined as being 90° in a case where the plate-thickness center line is parallel to the radial direction, and as being less than 90° in a case where the plate-thickness center line is inclined with respect to the radial direction by rotating to an opposite side to the flange around an inner end in the radial direction of the plate-thickness center line from a position of 90°, and
   when a distance in the axial direction from a side face on an opposite side to the flange among both side faces in the axial direction of the rim to an outer end in the radial direction of the plate-thickness center line is denoted by Pw, a length of the rim in the axial direction is denoted by Wr, and Pw/Wr is denoted by L, the wheel satisfies Formula (1) below:

$$L \geq 0.0223\alpha - 1.363 \qquad (1)$$

where, the angle α is 90° or less.

2. The wheel according to claim 1, wherein the angle α is 87° or less.

3. The wheel according to claim 1, wherein the web has a plate thickness that decreases as the web extends outward in the radial direction until a point inward from the outer end of the plate-thickness center line and has a minimum plate thickness at the point.

4. The wheel according to claim 2, wherein the web has a plate thickness that decreases as the web extends outward in the radial direction until a point inward from the outer end of the plate-thickness center line and has a minimum plate thickness at the point.

* * * * *